United States Patent
Konno et al.

[11] Patent Number: 5,872,901
[45] Date of Patent: Feb. 16, 1999

[54] MANIFOLD APPARATUS WITH BIDIRECTIONAL INTERFACE FOR CONNECTION TO A HOST COMPUTER

[75] Inventors: Toshihiro Konno, Tokyo; Koji Ikawa, Isehara; Toshiya Masuda, Abiko; Yukinori Okazaki, Tokyo; Masaaki Nagano, Yokohama; Tetsuya Asakura, Tokyo, all of Japan

[73] Assignee: Ricoh Company, Ltd., Tokyo, Japan

[21] Appl. No.: 786,194

[22] Filed: Jan. 21, 1997

Related U.S. Application Data

[63] Continuation of Ser. No. 409,726, Mar. 24, 1995, abandoned.

[30] Foreign Application Priority Data

Mar. 24, 1994 [JP] Japan .................................. 6-053926

[51] Int. Cl.⁶ .................................................. H04N 1/32
[52] U.S. Cl. ........................ 395/114; 358/442; 358/468
[58] Field of Search .................................... 358/400, 402, 358/403, 407, 442, 468; 395/114–115; H04N 1/32

[56] References Cited

U.S. PATENT DOCUMENTS

| | | | |
|---|---|---|---|
| 4,658,299 | 4/1987 | Tanaka et al. | |
| 5,021,892 | 6/1991 | Kita et al. | 358/468 |
| 5,041,918 | 8/1991 | Ishida et al. | 358/442 |
| 5,109,434 | 4/1992 | Shimizu et al. | 358/443 |
| 5,196,943 | 3/1993 | Hersee et al. | 358/403 |
| 5,200,830 | 4/1993 | Imaizumi et al. | 358/442 |
| 5,327,526 | 7/1994 | Nomura et al. | 395/114 |
| 5,621,540 | 4/1997 | Terajima | 358/468 |

FOREIGN PATENT DOCUMENTS

| | | |
|---|---|---|
| 36 07 066 | 7/1989 | Germany . |
| 42 28 801 | 4/1993 | Germany . |
| 3 270346 | 12/1991 | Japan . |

OTHER PUBLICATIONS

Das ISDN Sonderheft, No. 249, pp. 46–47, 1987, "Von Gruppe 3 Zu Gruppe 4" (with partial English translation).

*Primary Examiner*—Kim Yen Vu
*Attorney, Agent, or Firm*—Oblon, Spivak, McClelland, Maier & Neustadt, P.C.

[57] ABSTRACT

In a manifold apparatus having a plurality of functions including a printer function, facsimile function and copier function, facsimile data from a host computer are transferred to a system controller via a printer controller. Information on the destinations for facsimile communication are registered at an image memory. The system controller searches the image memory on the basis of destination data contained in the facsimile data, thereby determining whether the destination has a G3 function or a G4 function. If the destination has a G3 function, the system controller transforms the facsimile data to image data and transmits the image data via a facsimile controller. If a G4 function is available at the destination, the system controller transmits the facsimile data, or code data, without transforming them.

6 Claims, 5 Drawing Sheets

MANIFOLD APPARATUS WITH
BIDIRECTIONAL INTERFACE FOR
CONNECTION TO A HOST COMPUTER

This application is a Continuation of application Ser. No. 08/409,726, filed on Mar. 24, 1995, now abandoned.

BACKGROUND OF THE INVENTION

1. Field of the Invention

The present invention relates to a manifold apparatus having a plurality of functions including a printer function, facsimile function, and copier function.

2. Discussion of the Background

While G3 facsimile apparatuses using subscriber lines have heretofore been predominant, there is an increasing demand for G4 facsimile apparatuses available with an integrated services digital network (ISDN). ISDN is expected to promote high speed, low cost, and error free facsimile communication. For example, when a facsimile apparatus at a desired destination has only a G3 function, only images can be transmitted to the apparatus. In contrast, not only images but also texts can be transmitted if the other apparatus at the destination has a G4 function. It is a common practice to transmit only images without determining the function particular to the other apparatus. Hence, even if the other facsimile apparatus has a G4 function, it is impossible to reduce the communication time and cost by text transmission.

A manifold apparatus having a plurality of functions, including a printer function, facsimile function and copier function, is a recent achievement which further enhances the user's convenience. However, conventional manifold apparatuses have various problems left unsolved, as follows.

(1) Although image data to be transmitted can be transferred from the printer function to the facsimile function, all of them are transmitted at a time as a single document, i.e., it is impossible to transmit only the desired pages of a document. Hence, it is impossible to transmit only desired pages without printing such pages, causing a scanner to read them, and transmitting them by use of the facsimile function only, or without retransmitting the whole document.

(2) The printing function and the facsimile transmitting function are independent of each other and, therefore, prevent the apparatus from printing only desired pages while performing facsimile transmission. Specifically, when a person desires to send part of a document by facsimile and print another part of he document, the person must send the whole document by facsimile, print all the pages of the document, and then pick up desired pages out of the resulting printings. This wastes time, communication cost, and papers. This is also true when part of a document should be printed while being sent by facsimile at the same time.

(3) Because the facsimile transmitting function is independent of a host computer, the result of facsimile transmission cannot be confirmed without using the facsimile function. Specifically, a person operating a host computer is required to examine the result of transmission by manipulating the apparatus or to check a report printed by the facsimile function. Moreover, because the actual transmission time is not definite, the operator occupies the apparatus for confirmation repeatedly, obstructing the efficient use of the apparatus.

(4) The facsimile receiving function is also independent of a host computer. Hence, the operator of a host computer cannot see the result of facsimile reception without using the facsimile function, resulting in a problem similar to the above problem (3).

(5) When the facsimile function is accessed by a computer, the transmission of given document data and the print-out of the data for storage are implemented as independent functions. Hence, facsimile transmission and printing are not practicable unless the respective functions are designated.

(6) Received facsimile data are automatically deleted as soon as they are printed out on a paper, and therefore they cannot be used later.

(7) While the printer function can perform overlay alone, it cannot perform it in combination with the facsimile function.

(8) Received facsimile data are printed out without exception and must be printed out to see the result of reception. The apparatus, therefore, wastes paper, i.e., limited natural resources, and is apt to run out of paper when they are necessary. In addition, the apparatus increases the user's expenses.

(9) After data to be sent by facsimile have been transferred from a host computer to the apparatus, they cannot be cancelled or deleted except on the facsimile body.

(10) Generally, the actual top-and-bottom orientation of received facsimile data cannot be known. To confirm such an orientation, the operator must again get into communication with the person who sent the data.

(11) It is generally impossible for a person transmitting facsimile data to freely designate an orientation in which they should be output at a receiving station. Therefore, the data are output at the receiving station simply in the orientation and order in which they were sent to a scanner at the transmitting station.

(12) It has been customary to provide a facsimile apparatus and a printer with a millimeter-based resolution and an inch-based resolution, respectively. Hence, inch-to-millimeter conversion must be effected at an adequate stage in the event of transmitting a print output image by facsimile.

(13) Assume that the receiving station, receiving facsimile data, lacks a paper of the same width as or greater width than the document at the transmitting station. Then, the received image is output in a reduced scale and, therefore, apt to suffer from deterioration. Further, assume that when print codes are received, the resulting image is printed on a paper of a size smaller than the size expected at the transmitting station. Then, the image on the paper will be a disturbed image.

(14) The image process command of print code data has non-compressed image data. Hence, should the image process command of the printer and the image data are directly converted to facsimile data and transmitted, the facsimile data would be extremely great in amount.

(15) Generally, when a plurality of documents are sequentially sent by facsimile, the resolution is maintained constant. However, the first document to be sent by facsimile is often a cover page which does not need a high resolution.

(16) A manifold apparatus having a printer function and a facsimile function is available today, but it lacks a function which implements the combined use of a printer and a facsimile function, e.g., converts data delivered from a host computer to a printer to facsimile data and transmits the facsimile data.

(17) As to a manifold apparatus having a facsimile function, the user is required to effect various kinds of settings, including the registration of a telephone directory, by walking up to the apparatus.

(18) A conventional manifold apparatus having a facsimile function lacks a function of converting printer data and transmitting the converted data by facsimile.

(19) A conventional manifold apparatus having a facsimile function cannot inform a printer controller of the condition of the facsimile function.

(20) A conventional manifold apparatus having a facsimile function lacks a function of reporting the result of communication and other information to a host computer. This prevents the operator of the host from knowing the result of communication while communication is under way.

(21) A conventional manifold apparatus having a facsimile function lacks a function of providing a host computer with information on the other party every time facsimile communication occurs.

(22) The data transfer from a host computer to a manifold apparatus is limited to print data matching a printer, because the printer function and the facsimile function are independent of each other, as stated earlier. Hence, the apparatus and the host computer should only be connected by an interface of the kind dealing only with print data. However, if the facsimile function is capable of transmitting and receiving print data, remote control from the host computer is desirable.

(23) Data sent by the facsimile function are deleted as soon as they are printed out on a paper, as stated earlier. Therefore, documents received by facsimile cannot be managed as data files.

(24) The data transfer from a host computer connected to a manifold apparatus is limited to print data matching a printer, because the printer function and the facsimile function are independent of each other.

(25) The printer function and the facsimile function independent of each other require the user to operate the facsimile function on the operation panel of the manifold apparatus.

(26) Assume that two or more host computers are connected to the manifold apparatus, and that the printer function is occupied by a certain job. Then, another job cannot be executed by the printer function without waiting until the job under way ends.

SUMMARY OF THE INVENTION

It is, therefore, an object of the present invention to provide a manifold apparatus which eliminates the problems particular to the conventional manifold apparatuses as discussed above.

In accordance with the present invention, in a manifold apparatus having a system controller for controlling the entire system of the apparatus, a printer controller for controlling a printer section, a facsimile controller for controlling a facsimile section, and a storage for storing destination information for facsimile communication, the system controller searches, based on destination information contained in print data received from a host computer via the printer controller, the storage to determine whether a facsimile terminal at the destination has a G3 function or a G4 function, automatically transforms, if the facsimile terminal has a G3 function, the print data to an image in the printer section or transfers, if the facsimile terminal has a G4 function, the print data to the facsimile controller without transforming them, and then transmits the print data to said facsimile terminal.

In accordance with the present invention, in a manifold apparatus having a system controller for controlling the entire system of the apparatus, a printer controller for controlling a printer section, and a facsimile controller for controlling a facsimile section, the printer controller receives a plurality of print data from a host computer, selects desired pages out of the print data to thereby send print data to be transmitted to the system controller, and transmits the print data via the facsimile controller.

In accordance with the present invention, in a manifold apparatus having a system controller for controlling the entire system of the apparatus, a printer controller for controlling a printer section, and a facsimile controller for controlling a facsimile section, the printer controller receives a plurality of print data from a host computer, selects desired pages out of the of print data to thereby send print data to be transmitted to the system controller, and transmits the print data by facsimile via the facsimile controller. At the same time, the printer controller selects desired pages to deliver print data to be printed out to the system controller and prints them out.

In accordance with the present invention, in a manifold apparatus having a system controller for controlling the entire system of the apparatus, a printer controller for controlling a printer section, and a facsimile controller for controlling a facsimile section, the printer controller receives a plurality of print data from a host computer, selects desired pages out of the print data to thereby send print data to be transmitted to the system controller, and transmits the print data by facsimile via the facsimile controller. At the same time, the printer controller prints data of the desired pages.

In accordance with the present invention, in a manifold apparatus having a system controller for controlling the entire system of the apparatus, a printer controller for controlling a printer section, and a facsimile controller for controlling a facsimile section, the printer controller receives a plurality of print data from a host computer, selects desired pages out of the print data to thereby send print data to be transmitted to the system controller, and transmits the print data by facsimile via the facsimile controller. At the same time, the printer controller reports the result of transmission to the host computer.

In accordance with the present invention, in a manifold apparatus having a system controller for controlling the entire system of the apparatus, a printer controller for controlling a printer section, a facsimile controller for controlling a facsimile section, and a storage, the system controller monitors, on receiving a request for monitoring of facsimile reception from a host computer via the printer controller, determines whether or not a transmitting facsimile terminal is identical with a transmitting facsimile terminal data stored in the storage, and reports the result of decision to the host computer.

In accordance with the present invention, in a manifold apparatus having a system controller for controlling the entire system of the apparatus, a printer controller for controlling a printer section, and a facsimile controller for controlling a facsimile section, print data sent from a host computer to the system controller via the printer controller are transmitted to a destination via the facsimile controller and, at the same time, printed out by the printer section under the control of the printer controller.

In accordance with the present invention, in a manifold apparatus having a system controller for controlling the entire system of the apparatus, a printer controller for controlling a printer section, a facsimile controller for controlling a facsimile section, and a storage, facsimile data received by the facsimile controller via a subscriber line are transformed to an image under the control of the printer controller and then printed out by the printer. At the same time, the facsimile data transformed to an image and the data printed out are written to the storage.

In accordance with the present invention, a manifold apparatus has a system controller for controlling the entire system of the apparatus, a printer controller for controlling a printer section, a facsimile controller for controlling a facsimile section, a first storage for storing at least one regular form data representative of print data having a fixed format and frequently used for facsimile communication, a first controller for deleting or changing the regular form data, an interchanging section for interchanging the regular form data stored in the first storage with the other party over a line or a medium, and a second controller for interchanging, in the event of facsimile transmission, form data with the other party via the interchanging section and sending, if the same form data is registered at the other party, information on the form data together with data to be transmitted. The second controller reconstructs, in the event of facsimile reception and if use of the regular form is registered at received facsimile data, the received data by using the regular form data stored in the first storage on the basis of information on received regular form data.

In accordance with the present invention, a manifold apparatus has a system controller for controlling the entire system of the apparatus, a printer controller for controlling a printer section, a facsimile controller for controlling a facsimile section, a section for adding, when print data containing a control code particular to the apparatus are transformed to an image data and sent as facsimile data, an image pattern indicative of the top-and-bottom orientation of a document to a predetermined position of a page image, and a section for determining, when facsimile data are received and transformed to page image data, the up-and-down orientation of a received document on the basis the a position of a page.

In accordance with the present invention, a manifold apparatus has a system controller for controlling the entire system of the apparatus, a printer controller for controlling a printer section and having a command for designating a rotation of the output direction of a document, a facsimile controller for controlling a facsimile section, and a section for transmitting or receiving print data, containing a control code particular to the apparatus, as facsimile data in the form of code data or for rotating, when facsimile data are received in the form of print code data, rotating the direction of the facsimile data in response to a command included in the print code data.

In accordance with the present invention, a manifold apparatus has a system controller for controlling the entire system of the apparatus, a printer controller for controlling a printer section, a facsimile controller for controlling a facsimile section, and a section for changing, when the printer controller processes a millimeter-based image with an inch-based resolution, the magnification of the image for inch-to-millimeter conversion and then sending the image by facsimile.

In accordance with the present invention, a manifold apparatus has a system controller for controlling the entire system of the apparatus, a printer controller for controlling a printer section, a facsimile controller for controlling a facsimile section, and a section for transmitting or receiving print data, including a control code particular to the apparatus, in the form of code data, or for automatically reducing, when received code data are transformed to an image and if a paper of optimal size or greater size is not available, the received code data in scale and then transforming the received code data to image data.

In accordance with the present invention, a manifold apparatus has a system controller for controlling the entire system of the apparatus, a printer controller for controlling a printer section, and a facsimile controller for controlling a facsimile section. The printer controller has a section for separating an image process command from code data sent from a host computer to the printer controller, writing only the image process command and image data paired with the image process command in a page buffer, transmitting the image process command and image data by facsimile as image data, dividing the remaining data on a page basis, and sending the remaining data by facsimile as code data after adding image separation data thereto, and for combining, when facsimile data consisting of image data and code data are received from a remote facsimile terminal, an image represented by the image data and an image represented by the code data, and printing a resulting composite image.

In accordance with the present invention, a manifold apparatus has a system controller for controlling the entire system of the apparatus, a printer controller for controlling a printer section, a facsimile controller for controlling a facsimile section, and a section for automatically lowering, in the event of facsimile transmission, the resolution only for the first page of a document.

In accordance with the present invention, a manifold apparatus has a system controller for controlling the entire system of the apparatus, a printer controller for controlling a printer section, a facsimile controller for controlling a facsimile section, and a section for designating the destination of facsimile transmission in response to a printer command from a host computer.

In accordance with the present invention, a manifold apparatus has a system controller for controlling the entire system of the apparatus, a printer controller for controlling a printer section, a facsimile controller for controlling a facsimile section, and a section for controlling or registering a setting of the facsimile section in response to a printer command from a host computer.

In accordance with the present invention, a manifold apparatus has a system controller for controlling the entire system of the apparatus, a printer controller for controlling a printer section, a facsimile controller for controlling a facsimile section, and a section for reporting information on the other party registered at the facsimile section to the printer controller.

In accordance with the present invention, a manifold apparatus has a system controller for controlling the entire system of the apparatus, a printer controller for controlling a printer section, a facsimile controller for controlling a facsimile section, and a section for reporting the conditions of the facsimile section to the printer controller.

In accordance with the present invention, a manifold apparatus has a system controller for controlling the entire system of the apparatus, a printer controller for controlling a printer section, a facsimile controller for controlling a facsimile section, and a section for reporting information on the other party to a host computer each time of facsimile communication.

In accordance with the present invention, a manifold apparatus has a system controller for controlling the entire system of said apparatus, a printer controller for controlling a printer section, a facsimile controller for controlling a facsimile section, and a bidirectional interface for allowing the apparatus to communicate with a host computer, and for transmitting print data.

In accordance with the present invention, a manifold apparatus has a system controller for controlling the entire system of the apparatus, a printer controller for controlling a printer section, a facsimile controller for controlling a facsimile section, and a section for receiving print data, storing the print data in the apparatus as a file, and then transferring the file to a host computer.

In accordance with the present invention, a manifold apparatus has a system controller for controlling the entire system of the apparatus, a printer controller for controlling a printer section, a facsimile controller for controlling a facsimile section, and a section for transmitting or receiving a file, stored in a host computer connected to the apparatus, by the facsimile section via a bidirectional interface assigned to print data.

In accordance with the present invention, a manifold apparatus has a system controller for controlling the entire system of the apparatus, a printer controller for controlling a printer section, a facsimile controller for controlling a facsimile section, and a section for allowing, when print data are transmitted by the facsimile section, a particular transmission route to be selected on a host computer.

In accordance with the present invention, in a manifold apparatus having a printer section and a facsimile section and connectable to a plurality of host computers, when a printer request is received from any one of the host computers and if the printer section is occupied by another host computer, print data from the another host computer are sent from the facsimile section to a nearby manifold apparatus having a facsimile section and a printer section and then printed out thereby.

BRIEF DESCRIPTION OF THE DRAWINGS

The above and other objects, features and advantages of the present invention will become apparent from the following detailed description taken with the accompanying drawings in which.

DESCRIPTION OF THE PREFERRED EMBODIMENT

Figure 1:
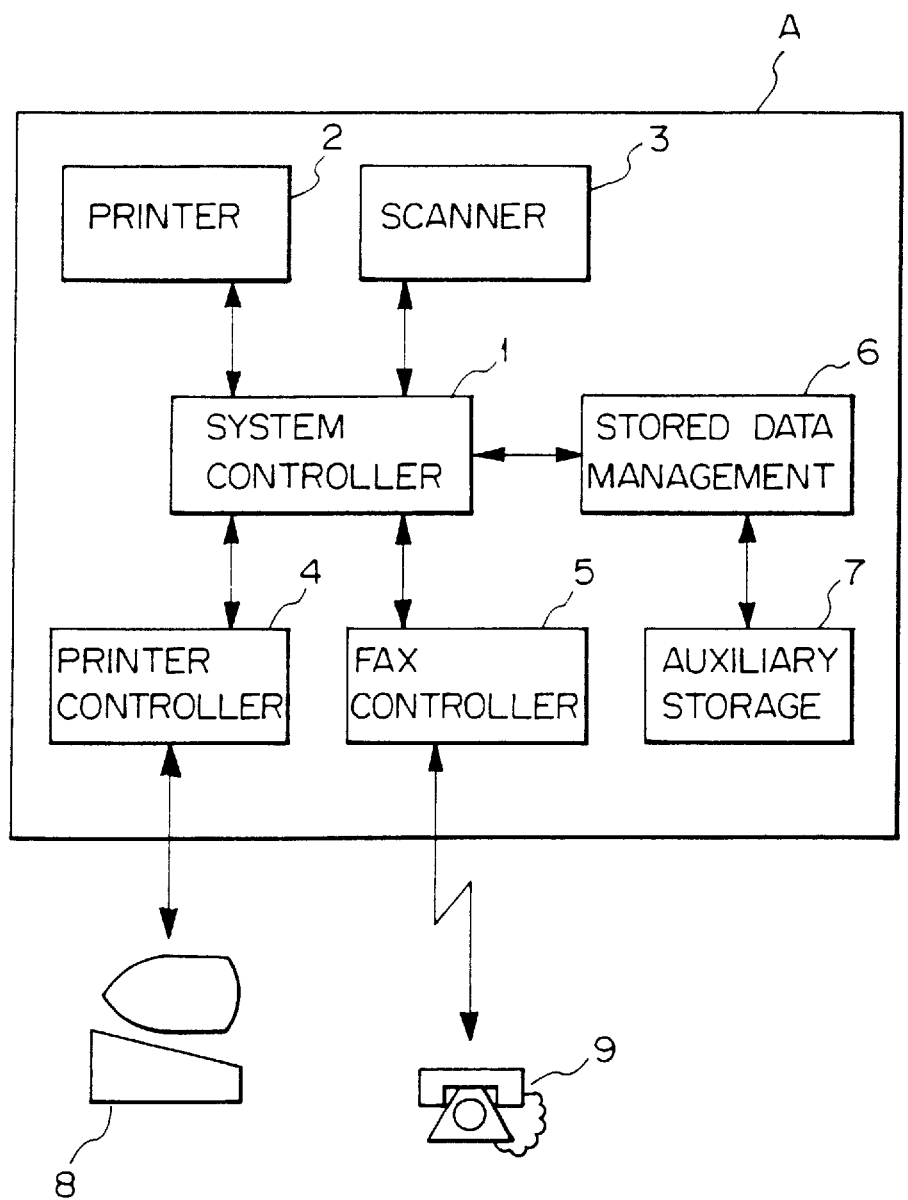
FIG. 1 is a block diagram schematically showing a manifold apparatus embodying the present invention.

Referring to FIG. 1 of the drawings, an apparatus embodying the present invention is shown. There are shown in the figure a system controller 1 for controlling various sections included in the apparatus, a printer 2 for printing out image data on paper, a scanner 3 for reading documents, a printer controller 4, a facsimile (FAX) controller 5, a stored data management 6 for managing stored data, an auxiliary storage 7, a host computer 8, and a subscriber line 9. The system controller 1, printer 2, scanner 3, printer controller 4, FAX controller 5, stored data management 6 and auxiliary storage 7 constitute a manifold apparatus A.

When print information are sent from the host 8 to the apparatus A, they are transformed to print data by the printer controller 4 and then output by the printer 2 under the control of the system controller 1. Image data generated by the scanner 3 are delivered to the FAX controller 5 via the system controller 1, coded by the FAX controller 5, and then transmitted over the subscriber line 9. On the other hand, image data received over the subscriber line 9 are decoded by the FAX controller 5 and then printed out by the printer 2 under the control of the system controller 1. At the same time, the print data to be transmitted or the received image data can be written to the auxiliary storage 7 under the control of the stored data management 6.

An interface (I/F) circuit, which will be described, is also included in the apparatus A to allow the host 8 or the subscriber line 9 and the apparatus A to interchange data signals with each other.

Figure 2:
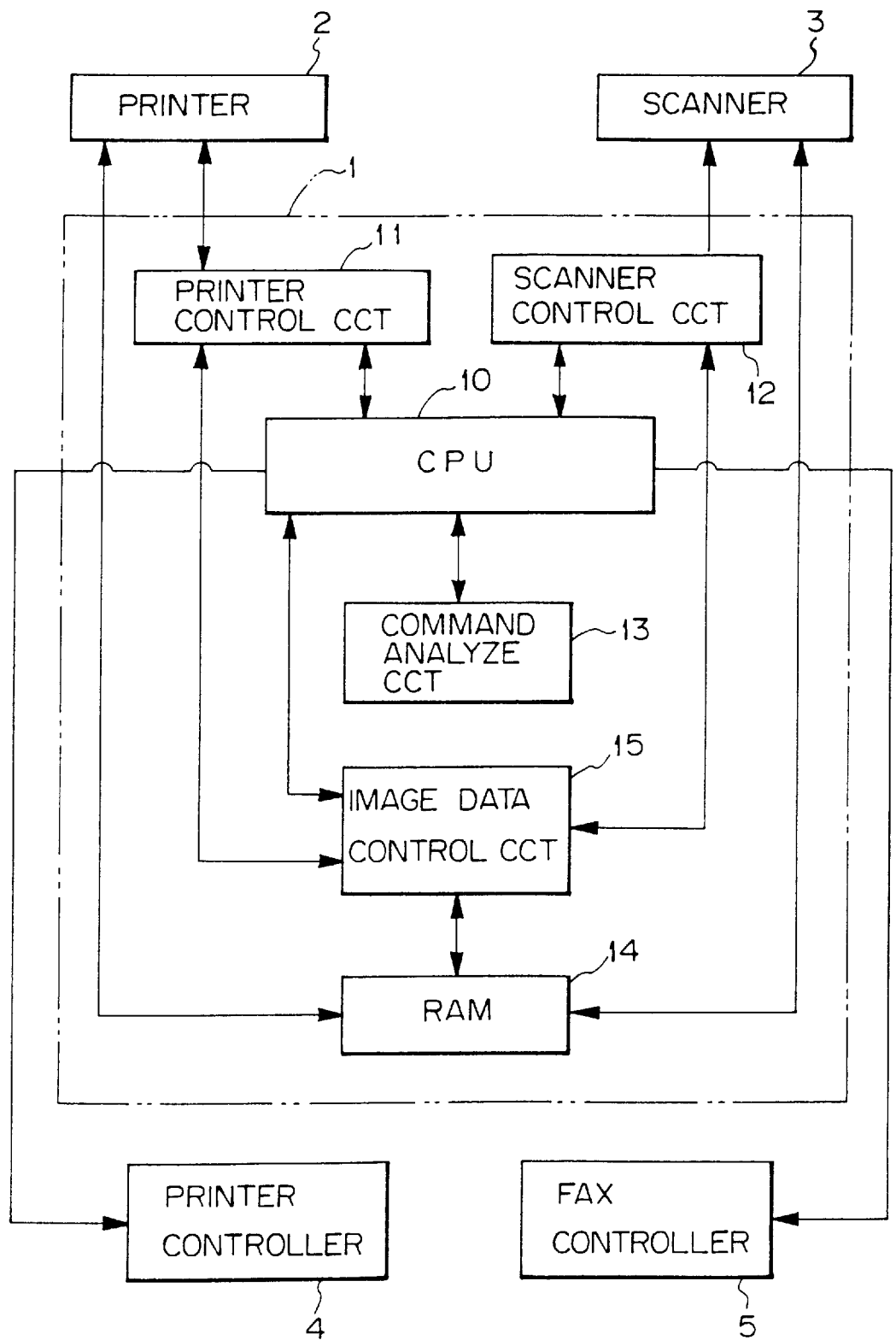
FIG. 2 is a block diagram schematically showing a system controller included in the embodiment.

As shown in FIG. 2 specifically, the system controller 1 has a CPU (Central Processing Unit) 10 and a printer control circuit 11. The printer control circuit 11 controls the printer 2 by sending commands, character codes, image data and so forth thereto. A scanner control circuit 12 causes the scanner 3 to send image data by sending a command thereto. A command analyzing circuit 13 analyzes various commands sent from the printer controller 4 and FAX controller 5 to the CPU 10 and delivers the analyzed commands to the CPU 10. A RAM (Random Access Memory), or image memory, 14 stores image data. An image data control circuit 15 writes image data received from the scanner 3, printer controller 4 or FAX controller 5 in the RAM 14 or manipulates data stored in the RAM 14, as the case may be. The printer control circuit 11, scanner control circuit 12, command analyzing circuit 13 and image data control circuit 15, as well as the printer controller 4 and FAX controller 5, operate under the control of the CPU 10.

The system controller 1 consists of the CPU 10, printer control circuit 11, scanner control circuit 12, command analyzing circuit 13, RAM 14, and image data control circuit 15.

While the system controller 1 executes various kinds of processing, four of them will be described hereinafter specifically.

(1) The system controller 1 arbitrates the printer controller 4 and FAX controller 5 as to the output request to the printer 2. Specifically, assume that FAX controller 5 generates an output command while the printer 2 is printing out image data from the printer controller 4. Then, the system controller 1 sends a wait command to the FAX controller 5 and sends, when the printing ends, a print OK command to the same.

(2) When the printer controller 4 and FAX controller 5 generate the output request at the same time, the system controller 1 sends a print OK command to one of the printer controller 4 and FAX controller 5 in accordance with a predetermined priority order while sending a wait command to the other.

(3) The system controller 1 causes the printer controller 4 and FAX controller 5 to interchange commands via the RAM 14 included in the system controller 1.

(4) When the printer controller 4 and FAX controller 5 interchange commands with each other, e.g., when the destination of facsimile communication is designated on the host 8, the system controller 1 transfers a command sent from the host 8 to the printer controller 4 to the FAX controller 5.

Figure 3:
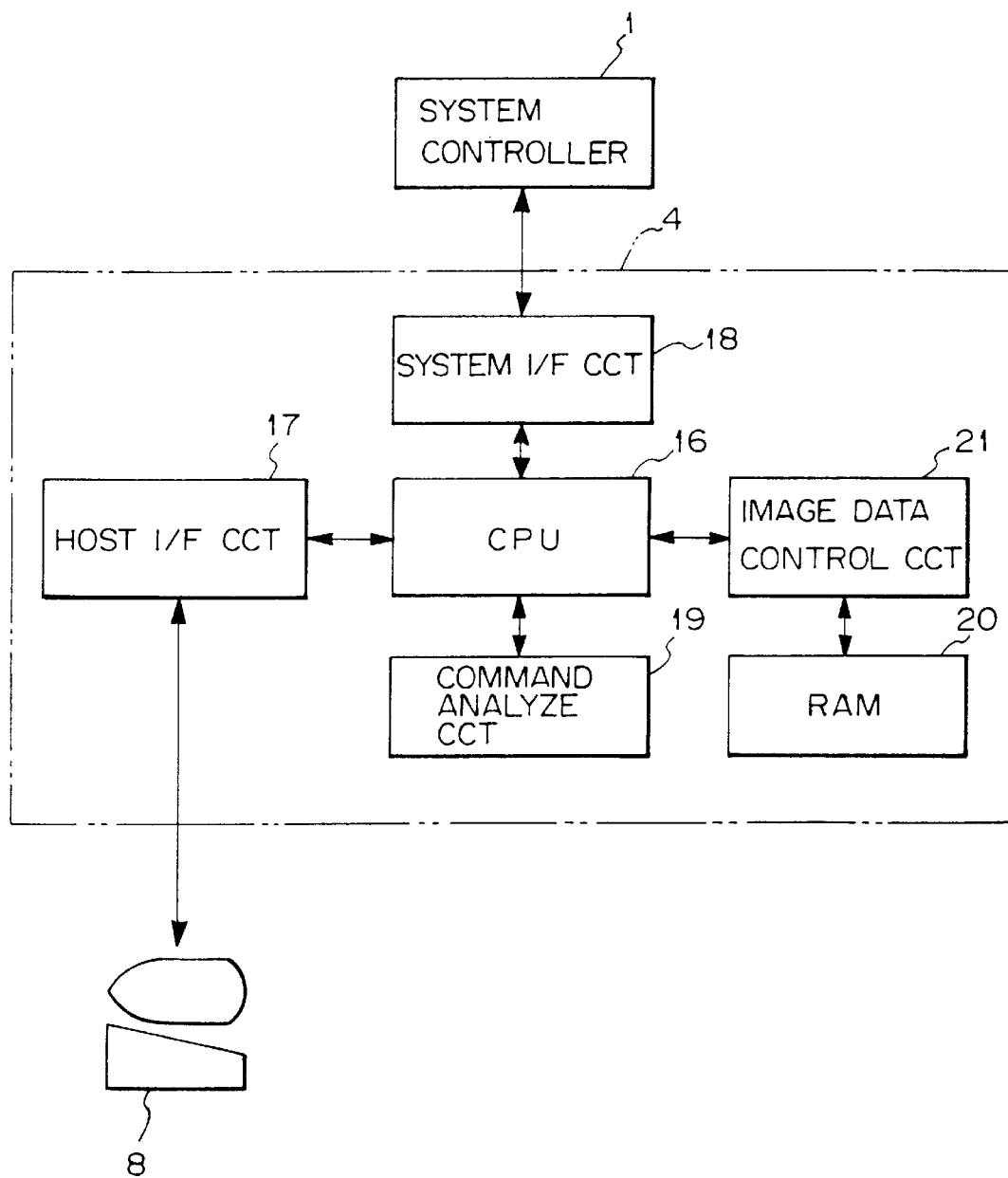
FIG. 3 is a schematic block diagram showing a printer controller also included in the embodiment.

FIG. 3 shows the printer controller 4 in detail. As shown, the printer controller 4 has a CPU 16, a host I/F circuit 17 interfacing the host 8 and CPU 16, a system I/F circuit 18 interfacing the system controller 1 and CPU 16, and a command analyzing circuit 19. The command analyzing circuit 19 analyzes commands sent from the host I/F circuit 17, system I/F circuit 18 and image data control circuit 21, which will be described, to the CPU 16 and delivers the analyzed commands to the CPU 16. The print controller 4 additionally has a RAM, or image memory, 20 for storing image data sent from the host 8. The image data control circuit 21 writes image data received from the host I/F circuit 17 or the system I/F circuit 18 or manipulates the data stored in the RAM 20, as needed.

Figure 4:
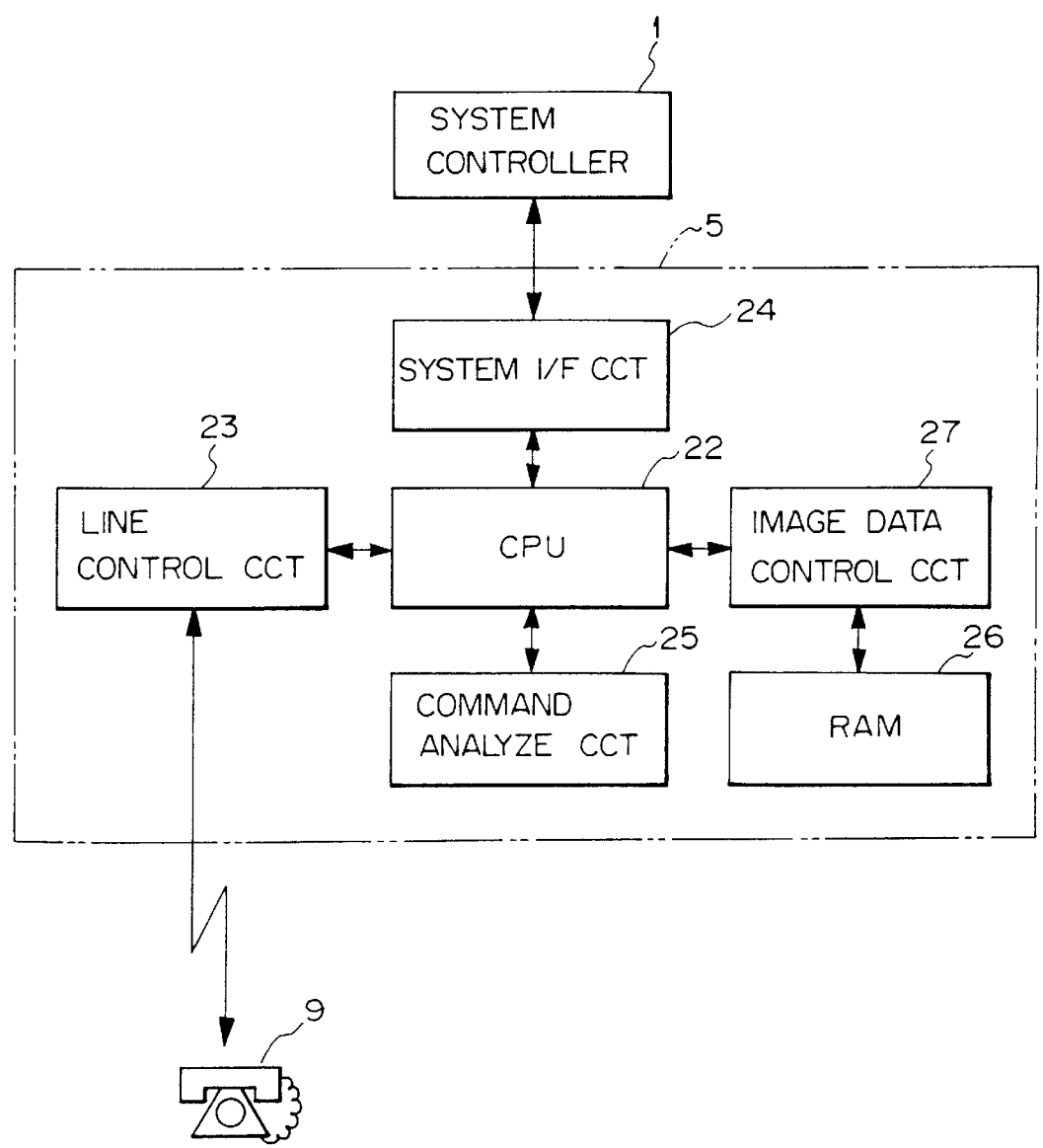
FIG. 4 is a schematic block diagram showing a facsimile controller also included in the embodiment.

FIG. 4 shows the FAX controller 5 in detail. As shown, the FAX controller 5 has a CPU 22, a line control circuit 23 connecting the subscriber line 9 and CPU 22, a system I/F circuit 24 interfacing the system controller 1 and CPU 22, and a command analyzing circuit 25. The command analyzing circuit 25 analyzes commands sent from the line control circuit 23, system I/F circuit 24 and image data control circuit 27, which will be described, to the CPU 22 and delivers the analyzed commands to the CPU 22. The FAX controller 5 additionally has a RAM, or image memory, 26 for storing image data. The image data control circuit 27 writes image data received from the line control circuit 23 or the system I/F circuit 24 in the RAM 26 or manipulates the data stored in the RAM 26, as needed.

Figure 5:
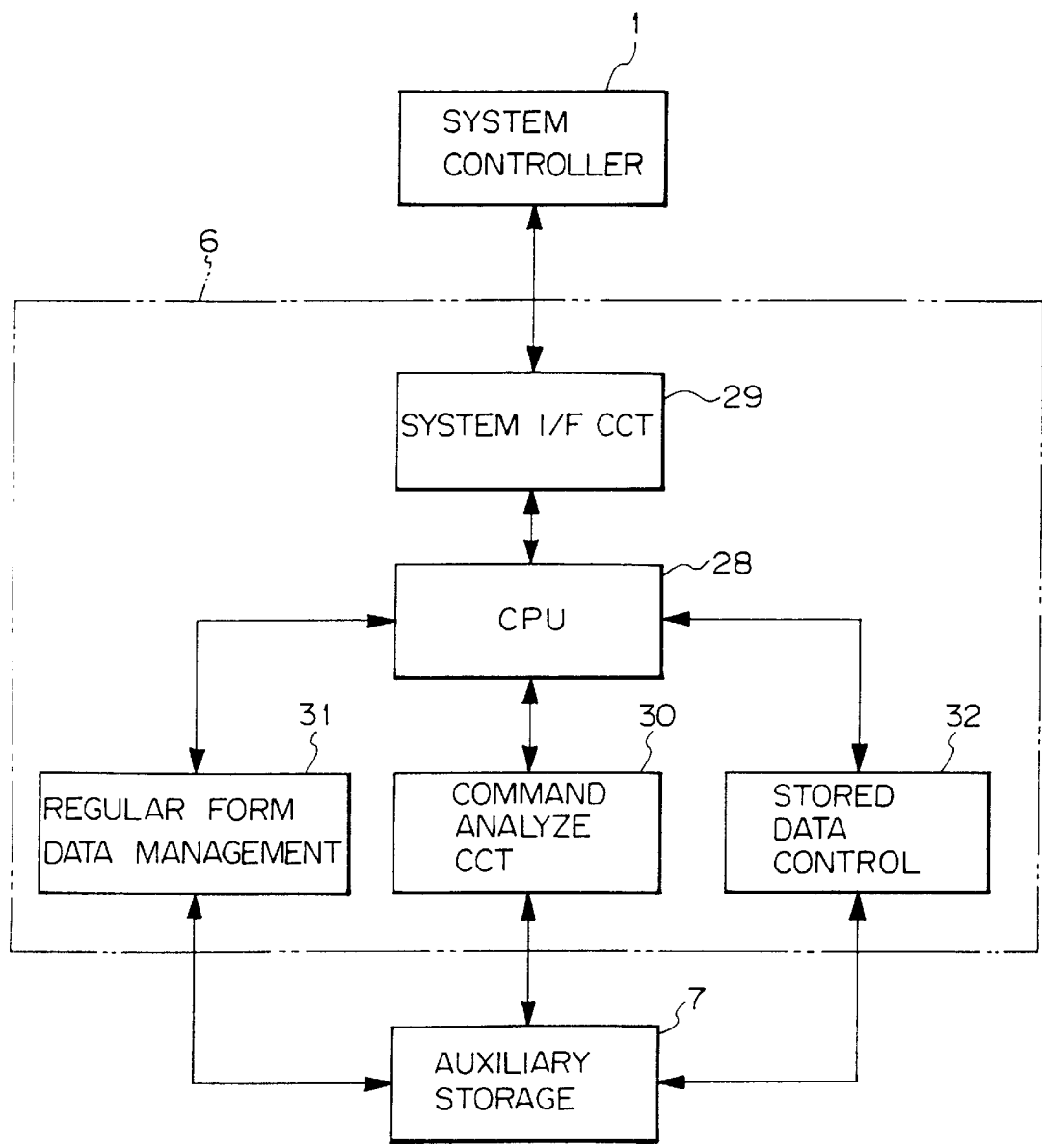
FIG. 5 is a schematic block diagram showing a stored data management further included in the embodiment.

As shown in FIG. 5 specifically, the data management 6 has a CPU 28, a system I/F circuit 29 interfacing the system controller 1 and CPU 28, a command analyzing circuit 30, a regular form data management 31, and a stored data control 32. The command analyzing circuit 30 analyzes commands received from the auxiliary storage 7 and CPU 28. The regular form data management 31 manages the input of regular form data to the auxiliary storage 7 or the output of such form data from the storage 7. The stored data control 32 writes or reads data to be sent or received data in or out of the auxiliary storage 7.

Print control and facsimile transmission/reception control systems available with the apparatus A will be described with reference to FIGS. 1–5.

Control System (1)

The host 8 (see FIG. 3) sends print data to be sent by facsimile to the CPU 16 via the host I/F circuit 17 of the printer controller 4. The print data are implemented as code data and contain data designating the destination. On receiving the print data, the CPU 16 requests the system controller 1 (see FIG. 1) to execute facsimile transmission via the system I/F circuit 18. In response, the system controller 1 informs the FAX controller 5 of the facsimile transmission request and delivers the destination data to the FAX controller 5. The FAX controller 5 (see FIG. 4), after receiving the destination data, searches the RAM 26 to determine whether or not the designation registered there has a G4 function. The FAX controller 5 returns the result of the search to the system controller 1.

On receiving the result of the search, the system controller 1 determines whether the data should be sent in the form of code data or in the form of image data, and then commands the CPU 16 (see FIG. 3) to start transmitting the data. Specifically, the system controller 1 selects code data if the designation has a G4 function as registered at the RAM 26 or selects image data if otherwise. When image data is selected, the CPU 16 causes the image data control circuit 21 to transform the code data to image data, writes the image data in the RAM 20, and delivers the image data to the system controller 1. When code data is selected, the CPU 16 directly delivers the code data to the RAM 20 without the intermediary of the RAM 20.

The system controller 1 sends the data received from the printer controller 4 to the FAX controller 5 on a page basis if the data are image data, or directly sends the data to the FAX controller 5 if the data are code data.

When the data sent to the FAX controller 5 are image data, the image data control circuit 21 compresses the image data stored in the RAM 20 (see FIG. 3) and writes the compressed data in the RAM 26 of the FAX controller 5. Subsequently, the line control circuit 23 calls a facsimile terminal at the destination and then sends the data stored in the RAM 26. In the case of code data, the code data are written to the RAM 26 without being compressed.

As stated above, only if print data are sent from the host 8 to the apparatus A, the FAX controller 5 selects an optimal transmission mode. This makes it needless for the operator of the host 8 to be aware of the functions available with the destination, thereby reducing communication cost.

Control System (2)

The host 8 sends print data for facsimile transmission to the CPU 16 via the host I/F circuit 17. The print data are implemented as code data and contain data designating the destination. In response, the CPU 16 requests the system controller 1 to effect facsimile transmission via the system I/F circuit 18. The system controller 1 informs the FAX controller 5 of the request and delivers the designation data to the FAX controller 5. The FAX controller 5 answers the system controller 1. Further, the system controller 1 sends a print start command to the CPU 16.

The CPU 16 selects only a designated page or pages while skipping the preceding pages, transforms the print data of the designated pages to image data, writes the image data in the RAM 20, and then delivers the image data to the system controller 1. The system controller 1 transfers the image data to the FAX controller 5 page by page.

In the printer controller 4, the image data control circuit 21 compresses the image data stored in the RAM 20 (see FIG. 3). The compressed image data are sent to the FAX controller 5 and written to the RAM 26 (see FIG. 4). Subsequently, the line control circuit 23 calls the facsimile terminal at the destination and then sends the print data stored in the RAM 26.

With the above control, it is possible to select only a desired page or pages out of the print data received from the host 8 and send it by facsimile. This successfully saves paper and reduces communication cost.

Control System (3)

The host 8 sends print data to be sent by facsimile to the CPU 16 via the host I/F circuit 17. The print data are implemented as code data and contain data designating the destination and data designating pages to be transmitted or to be printed. In response, the CPU 16 requests the system controller 1 to send data by facsimile via the system I/F circuit 18. The system controller 1 informs the FAX controller 5 of the request and sends the destination data to the FAX controller 5. In response, the FAX controller 5 answers the system controller 1.

On receiving the answer from the FAX controller 5, the system controller 1 delivers a print start command to the CPU 16. In response, the CPU 16 selects only the designated page or pages while skipping the preceding pages. The image control circuit 21 transforms the print data of the designated pages to image data and writes the image data in the RAM 20. The image data stored in the RAM 20 are sent to the system controller 1 together with data indicative of transmission/printing.

When transmission is selected, the system controller 1 sends the image data to the FAX controller 5 page by page. At this instant, the image data stored in the RAM 20 of the printer controller 4 and compressed by the image data control circuit 21 are sent to the FAX controller 5. The compressed data are written to the RAM 26 of the FAX controller 5. Subsequently, the line controller 23 calls the destination and sends the print data stored in the RAM 26. On the other hand, when printing is selected, the system controller 1 causes the printer 2 to print out the data.

As stated above, the control system (3) allows only the desired pages to be sent by facsimile or printed, and thereby saves running cost while reducing the waiting time. Hence, the apparatus A is easy to use.

Control System (4)

The host 8 sends print data to be sent by facsimile to the CPU 16 via the host I/F circuit 17. The print data are implemented as code data and contain data designating the destination, data designating a desired page or pages, and data commanding simultaneous printing and transmission. In response, the CPU 16 requests the system controller 1 to send data by facsimile via the system I/F circuit 18. The system controller 1 informs the FAX controller 5 of the request and sends the destination data thereto. In response, the FAX controller 5 answers the system controller 1. Further, the system controller 1 sends a print start command to the CPU 16.

The CPU 16 selects only the designated pages while skipping the preceding pages. The image data control circuit 21 transforms the code data of the designated pages to image data and writes the image data in the RAM 20. The image data are sent to the system controller 1 together with the simultaneous printing and transmission command data. The system controller 1 transfers the image data to the FAX controller 5 page by page while causing the printer 2 to print the image data out.

In the system controller 4, the image data stored in the RAM 20 are compressed by the image data control circuit 21 and then sent to the FAX controller 5. In the FAX controller 5, the image data are written to the RAM 26. Subsequently, the line control circuit 23 calls the facsimile terminal at the destination and then sends the print data stored in the RAM 26 thereto.

As stated above, only desired pages can be printed while being sent by facsimile at the same time. This also saves running cost and waiting time, and thereby ensures the easy use of the apparatus A.

Control System (5)

The host 8 is connected to the host I/F 17 by a bidirectional communication circuit. The host 8 sends print data to be sent by facsimile to the CPU 16 via the host I/F circuit 17. The print data are implemented as code data and contain data designating the destination, and result report command data. In response, the CPU 16 requests the system controller 1 to send data by facsimile via the system I/F circuit 18. The system controller 1 informs the FAX controller 5 of the request and transfers the destination data and result report command data thereto. In response, the FAX controller 5 answers the system controller 1. Further, the system controller 1 sends a print start command to the CPU 16.

The CPU 16 causes the image control circuit 21 to transform the code data of designated page or pages to image data and write the image data in the RAM 20. The image data are sent to the system controller 1 together with a transmission command. The system controller 1 transfers the image data to the FAX controller 5 page by page.

In the system controller 4, the image data stored in the RAM 20 are compressed by the image data control circuit 21 and then sent to the FAX controller 5. In the FAX controller, the image data are written to the RAM 26. Subsequently, the line control circuit 23 calls the facsimile terminal at the destination and then sends the print data stored in the RAM 26 thereto.

On the completion of the transmission, the line control circuit 23 reports it to the CPU 22. The system controller 1 reports to the host 8 of the end of transmission via the CPU 16 of the printer controller 4 in accordance with the result report command data stored in the RAM 26 of the FAX controller 5.

In this manner, the control system (5) reports the end of transmission to the host 8 by way of the printing function. This makes it needless for the operator of the host 8 to operate the apparatus A for confirmation. That is, the operator should only wait for the report from the apparatus A.

Control System (6)

The host 8 is connected to the host I/F circuit 17 by a bidirectional communication circuit. The host 8 sends reception monitor command data to the CPU 16 via the host I/F circuit 17. This data commands either an immediate response or a response after the end of facsimile reception. In addition, the data contains transmitting terminal data representative of a facsimile terminal from which data will be received. On receiving the reception monitor command data, the CPU 16 requests the system controller 1 to monitor the reception of facsimile data. The system controller 1 informs the FAX controller 5 of the request.

When an immediate response is required, the FAX controller 5 determines whether or not received data representative of the transmitting terminal is identical with the transmitting terminal data stored in the RAM 26. The system controller 1 reports the result of reception to the CPU 16 while causing the printer 2 to print it out. Further, the CPU 16 informs the host 8 of the result of reception. If the actual terminal is not identical with the designated terminal stored in the RAM 26, the CPU 16 does not report the result of reception to the host 8; the system controller 1 simply causes the printer 2 to print out the received data.

For a response after the end of facsimile reception, the FAX controller 5 writes the reception monitor command data in the RAM 26 and then answers the system controller 1. When the apparatus A is called by a remote facsimile terminal, the line control circuit 23 receives data from the transmitting terminal and causes the data to be written to the RAM 26. On the completion of the reception, the line control circuit 23 reports it to the CPU 22. The FAX controller 5 determines whether or not the terminal sent the facsimile data is identical with the designated terminal stored in the RAM 26. If the former is identical with the latter, the FAX controller 5 reports the result of reception to the system controller 1. In response, the system controller 3 reports it to the CPU 16. As a result, the CPU 16 informs the host 8 of the result of reception and causes the printer 2 to print it out.

As stated above, the control system (5) reports the result of reception to the host 8 via the printing function, and therefore makes it needless for the operator of the host 8 to manipulate the apparatus A for confirmation. This enhances the efficient use of the apparatus A and requires the operator of the host 8 only to access the apparatus A or wait for a report from the apparatus A.

Control System (7)

The host 8 sends print data to be sent by facsimile to the CPU 16 via the host I/F 17. The print data are implemented as code data and contain the previously mentioned destination data and simultaneous printing and transmission command data. On receiving the print data, the CPU 16 requests the system controller 1 to effect printing and facsimile transmission at the same time via the system I/F circuit 18. In response, the system controller 1 causes the image data control circuit 21 to write the print data in the RAM 20. Subsequently, the system controller 1 determines whether or not the FAX controller 5 is usable. If it is usable or idle, the system controller 1 causes the image data control circuit 21 to compress the image data stored in the RAM 20. The compressed image data are written to the RAM 26 of the FAX controller 5. Then, the line controller 23 calls the facsimile terminal at the destination and sends the image data stored in the RAM 26 thereto. If the FAX controller 5 is not usable or busy, the system controller 1 causes the image data to be transferred from the RAM 20 to the auxiliary storage 7 (see FIG. 1). In this case, the image data are transmitted as soon as the FAX controller 5 becomes idle.

Further, just after the start of transmission, the system controller 4 determines whether or not the printer controller 4 is idle. If it is idle, the system controller 1 starts up the printer 2 via the printer controller 4 with the result that the image data stored in the RAM 20 are printed out on a paper. If the printer controller 4 is busy, the image data stored in the RAM 20 are transferred to the auxiliary storage 7 and then printed out as soon as the printer controller 4 becomes idle.

With the above control, it is possible to deal with a transmission request and a print request by use of a single command.

Control System (8)

When facsimile data come in over the subscriber line 9 (see FIG. 4), the FAX controller 5 receives the data and writes the data in the RAM 26. At the same time, the FAX controller 5 reports the reception to the system controller 1. In response, the system controller 1 determines whether or not the host 8 has commanded it to effect printing at the same time as reception. If the host 8 has commanded such an operation, the system controller 1 determines whether or not the printer controller 4 is idle. If it is idle, the system controller 1 writes the received data in the RAM 20. Thereafter, the system controller 1 starts up the printer 2 via the printer controller 4 and causes it to print out the image data stored in the RAM 20.

If the printer controller 4 is busy, the received data are transferred to the auxiliary storage 7 and then printed out as soon as the printer controller 4 becomes idle. When all the data have been written to the storage 7, a mark indicative of the end of printing is added to the data and also written to the storage 7.

As stated above, the control system (8) preserves the received data in the auxiliary storage 7 even after the received data have been printed out on a paper. This allows the received data to be used later.

Control System (9)

The auxiliary storage 7 has a regular form area available for regular form data which are managed independently of the stored data described in relation to the control system (8). Code data from the host 8 are received by the printer controller 4 and then transferred to the system controller 1. If the code data contains a regular form data register request, the system controller 1 causes the image data control circuit 21 to write image data representative of the regular form data in the RAM 20. Subsequently, the system controller 1 starts up the regular form data management 31. In response, the management 31 writes the image data of the RAM 20 in the regular form area of the auxiliary storage 7.

When a regular form read out by the scanner 3 (see FIG. 1) should be registered, it is also written to the RAM 20 in the form of image data. Subsequently, the system controller 1 starts up the regular form data management 31. In response, the management 31 writes the image data of the RAM 20 in the regular form area of the auxiliary storage 7. At this instant, a name to be given to the image data is entered on the host 8 and written to the RAM 20 together with the image data.

When a request for, for example, the deletion of the registered regular form data or the change of the name given to the data is entered on the host 8 or the like, the system controller 1 starts up the regular form data management 31 and executes the requested job. In addition, the regular form data of the auxiliary storage 7 may be changed via the management 31 on an apparatus or line of the same kind as the apparatus A or any other suitable medium which is connected to the apparatus A either constantly or synchronously.

A specific operation of the facsimile function using a regular form and available with the above control system (9) is as follows. In the event of transmission, if the data from the host 8 contains a regular form, the system controller 1 starts up the regular form data management 31 and causes it to write the designated regular form in the RAM 20. Subsequently, the system controller causes the FAX controller 5 to set up the connection to a facsimile terminal at the destination and interchange information. If the terminal at the destination lacks regular form data of the same kind, the data to be transmitted are written to the RAM 20 over the regular form data (OR writing). Thereafter, the data stored in the RAM 20 are sent to the remote terminal.

If the destination has regular form data of the same kind, the RAM 20 is cleared, and then the data to be sent are written to the RAM 20. Subsequently, the data stored in the RAM 20 are sent to the destination with the regular form added thereto. At the destination, regular form data are searched for on the basis of the received regular form data and then written to a storage. The received data are written to the storage over the form data. Finally, the composite data are printed out on a paper.

Assume that the system controller 1 determines that received data contains regular form data. Then, the controller 1 causes the regular form data management 31 to write the designated regular form data in the RAM 20 as an image. Then, the controller 1 writes the received data in the RAM 20 over the form data (OR writing). Subsequently, the controller 1 stores the composite data in the RAM 20 and, at the same time, causes the printer 2 to print them out via the printer controller 4.

As stated above, overlay printing is achievable with the combination of the printer function and facsimile function. This successfully reduces the amount of data to be sent or received and, therefore, the communication (line) cost.

Control System (10)

The printer controller 4 receives code data from the host 3 first and reports the reception to the system controller 1. If the code data is a regular form data register request, the system controller 1 writes it in the RAM 20. Then, the controller 1 causes the regular format data management 31 to transfer the image data stored in the RAM to the regular form area of the auxiliary storage 7. This is also true with the regular form of data read by the scanner 3. Specifically, the data read by the scanner 3 are written to the RAM 20 as an image. Then, the controller 1 causes the regular form data management 31 to write the image data stored in the RAM 20 in the regular form area of the storage 7.

After the designated regular form data have been written to the RAM 20, data read by the scanner 3 of the facsimile function are written to the RAM 20 over the regular form data. The composite data in the RAM 20 are compressed by the image data control circuit 21, written to the RAM 26, and then transmitted to the destination.

Likewise, data received from the host 8 are written to the RAM 20 over the regular form data stored in the RAM 20. The resulting data are also compressed by the image data control circuit 21, stored in the RAM 26, and then transmitted to the destination.

Thus, when the facsimile function also uses a regular form, data can be transmitted or received in a regular form due to the overlaying function.

Control System (11)

The host 8 sends to the CPU 16 code data for managing the files of print data existing in the auxiliary storage 7. In response, the CPU 16 requests, via the system I/F circuit 18, the system controller 1 to manage the files of print data stored in the storage 7. On receiving the request, the system controller 1 retrieves the files or a list thereof or otherwise manages the files via the stored data management 6. For example, when a request for the display of a desired file of received data is recived, the system controller 1 sends a list of received data files stored in the storage 7 to the host 8. When one of the data files to be printed out is input on the host 8, the system controller 1 writes the designated data file in the RAM 20 and starts up the printer controller 4. As a result, the printer controller 4 causes the printer 2 to print out the designated data file on a paper.

With the above control, it is possible for the operator of the host 8 to select only particular received data and cause the printer 2 to print them out.

Control System (12)

The host 8 sends to the CPU 16 code data for managing the files of print data existing in the auxiliary storage 7. In response, the CPU 16 requests, via the system I/F circuit 18, the system controller 1 to manage the files of print data stored in the storage 7. On receiving the request, the system controller 1 executes processing matching the request and then reports the result to the host 8. File management includes the following.

When a request for a list of stored data is input on the host 8, the system controller 1 starts up the stored data management 6 and sends a list of print data existing in the auxiliary storage 7 to the host 8. The host 8 displays the list of print data thereon.

When a request for the cancellation of transmission is input on the host 8, the system controller 1 starts up the stored data management 6 and cancels the transmission waiting status of, among the print data stored in the storage 7, the print data designated by the host 8. In this case, the stored data management 6 does not delete the data.

When a request for the deletion of particular data is entered on the host 8, the system controller 1 causes the stored data management 6 to delete the designated data existing in the storage 7.

When a request for the change of particular data is entered on the host 8, the system controller 1 starts up the stored data management 6, sends the designated print data existing in the storage 7 to the host 8, and cancels the transmission waiting status of the same print data. On receiving revised data from the host 8, the controller 1 causes the stored data management 6 to replace the existing data with the revised data.

Further, on receiving a data addition (combination) request from the host 8, the system controller 1 starts up the stored data management 6 so as to combine, among the print data existing in the storage 7, the designated independent data and again register such data as a single set of data.

As stated above, the control system (12) allows the operator of the host 8 to cancel transmission, delete data to be transmitted, change or add data, or combine a plurality of data, as desired. Further, the operator of the host 8 can effect facsimile transmission without walking up to the facsimile section.

Control System (13)

Assume that in the event of transmission of print data in the form of an image, the command analyzing circuit 19 (see FIG. 3) receives print data (including a control code meant for the printer controller 4) from the host 8 via the host I/F circuit 17. Then, the CPU 16 requests the image data control circuit 21 to write the print data in the RAM 20 in the form of an image. After the image data control circuit 21 has written the print data in the RAM 20, it requests, via the system controller 1, the command analyzing circuit 25 of the FAX controller 5 to transmit the image existing in the RAM 20. In response, the analyzing circuit 25 determines the top-and-bottom orientation of the page on the basis of the size and orientation of the RAM 30, and adds a marker to a predetermined position. The resulting image is transmitted or stored as facsimile data.

In the event of facsimile reception, the command analyzing circuit 25 of the FAX controller 5 writes the received facsimile data in the RAM, or page buffer, 26 as an image. The image data control circuit 27 searches the image stored in the RAM 26 in order to detect a marker and then determines the top-and-bottom orientation of the received document.

With the above control system, it is possible to report the top-and-bottom position of a document to be sent and to determine the position of a received document on the basis of a marker.

Control System (14)

When print data from a transmitting facsimile terminal are received as they are, the command analyzing circuit 25 of the FAX controller 5 sees that they are code data on the basis of additional information contained in the facsimile data. Then, the code data are transferred to the command analyzing circuit 19 of the printer controller 4 via the command analyzing circuit 25. In response, the command analyzing circuit 19 requests the image data control circuit 21 to write the print data as an image. At this instant, if the print data contain a rotation command, the image data control circuit 21 rotates the writing direction accordingly.

As described above, the control system (14) allows the received data to be rotated in accordance with a command contained in the data and, therefore, allows the transmitting terminal to specify an outputting direction.

Control System (15)

Assume that print data, or code data, from the host 8 are received by the printer controller 4 and then transmitted by facsimile in the form of an image. In this case, the command analyzing circuit 19 assumes that the print data has an inch-based resolution for printing and closest to the millimeter-based RAM 20. Then, the analyzing circuit 19 for receiving the print data assumes that the circuit 19, closest to the millimeter-based RAM 20, has an inch-based resolution assigned to printing. The analyzing circuit 19 changes the magnification of the print data by inch-to-millimeter conversion and writes the resulting print data in the RAM 20. Specifically, the analyzing circuit selects a font image optimal for the new magnification and changes the magnification of only characters, line pitch and so forth, i.e., an image command and other factors which should be directly dealt with as an image.

The image data written to the RAM 20 with a millimeter-based resolution are reported to the command analyzing circuit 25 of the FAX controller 5. As a result, the image written in the RAM 20 is stored or transmitted in the form of a facsimile signal.

As stated above, when the print output image is to be sent as facsimile data, it is written to the RAM 20 in a millimeter-based size and then subjected to inch-to-millimeter conversion by an inch-based resolution particular to the printer 2 closest to the RAM 20. Because the font image is not changed in magnification, the millimeter-based image is prevented from being degraded.

Control System (16)

When print data from a transmitting facsimile terminal are received as they are, the command analyzing circuit 25 of the FAX controller 5 recognizes that the print data are code data on the basis of additional information contained in the facsimile data. Then, the CPU 22 transfers the code data to the command analyzing circuit 19 of the printer controller 4 via the system controller 1. At this instant, the width and length of the facsimile document are also reported from the analyzing circuit 25 to the analyzing circuit 19.

On receiving the print data, the analyzing circuit 19 requests the image data control circuit 21 to write the print data in the form of an image. At this instant, the analyzing circuit 19 determines a paper size for writing the print data on the basis of the width and length received from the analyzing circuit 25 of the FAX control circuit 5. Of course, if the print data contain a command specifying a particular paper size, the analyzing circuit 19 selects such a paper size. If papers whose size is equal to or greater than the determined size is not available, the analyzing circuit 19 searches for papers of the greatest size, determines a reduction ratio which allows the entire document to be accommodated in such a paper, reduces the print data by the determined reduction ratio, and then requests the image data control circuit 21 to write the print data. Assuming that the document size is A4 while the paper size available is B5, then the reduction ratio will be 0.87.

As stated above, when print data are directly converted to facsimile data to be sent or received, the control system (16) causes the printer 2 to output an image while reducing the data in size in matching relation to the paper size available at the receiving station. This ensures an optimal output while protecting the image quality from noticeable deterioration.

Control System (17)

Assume that print data, or code data, from the host 8 are received by the printer controller 4 and then directly output as facsimile data. Then, the command analyzing circuit 19 of the printer controller 4 analyzes a command contained in the print data and divides, based on the command, the print data into pages matching papers on which the print data should be output. Further, the analyzing circuit 19 separates only an image command and image data to be controlled thereby out of the print data. The image data are written to the RAM 20 in accordance with the image command under the control of the image data control circuit 21. Because the image command and image data are separated from the print data, text and control command data for controlling the various sections of the apparatus A are left.

The analyzing circuit 19 adds image separation data to the text and control command data to show that the image command and image data have been separated. Such data are sent from the analyzing circuit 19 to the analyzing circuit 25 via the system controller 1 page by page. The analyzing circuit 25 waits until the image data control circuit 21 writes all the image data in the RAM 20. Subsequently, the analyzing circuit 25 transforms the image separation data and text and control command data received from the analyzing circuit 19 to facsimile data. At the same time, the analyzing circuit compresses the separated image data in the same manner as ordinary image data and stores or transmits the resulting facsimile data.

Assume that such facsimile data, consisting of text and control command data and image data are received from another facsimile terminal. Then, the command analyzing circuit 25 of the FAX controller 5 receives the facsimile data as they are. Additional data also contained in the facsimile data shows the analyzing circuit 25 that the received data are code data, and that the text and control command data and the image data have been separated at the transmitting terminal. The analyzing circuit 25 writes the image data, paired with the image command, in the RAM 26 and then sends to the text and control command data and image data to the command analyzing circuit 19 of the printer controller 4. In response, the analyzing circuit 19 causes the image data control circuit 21 to write the image data in the RAM 20. As a result, composite image data consisting of an image and codes are completed in the RAM 20.

As stated above, the control system (17) separates an image command and image data from print data, divides the remaining data into pages matching the size of papers, transforms only image data to an image, and sends code data as they are by facsimile while sending image data as an image after compression. At a receiving station, a composite image consisting of the image and code data is produced. This successfully reduces the amount of facsimile data to be transmitted.

Control System (18)

This control system can provide each page of a document to be transmitted with a particular resolution and includes means for setting a resolution for the first page beforehand. Data generated by reading a document are transferred to the command analyzing circuit 25 of the FAX controller 5. The analyzing circuit 25 transforms the first page to facsimile data with an exclusive resolution. Subsequently, the analyzing circuit 25 transforms the second page and successive pages to facsimile data with the current transmission resolution received from the command analyzing circuit 25. Such facsimile data are transmitted or written to the auxiliary storage 7. This system can provide only the first page of a document with a comparatively low resolution, thereby reducing the amount of data to be transmitted by facsimile.

Control System (19)

Assume that print data, a command for sending the print data by facsimile, and destination information are delivered from the host 8 to the printer 2 via the printer controller 4 and system controller 1. The destination information may be implemented as a telephone number or a symbol included in a telephone directory registered at the facsimile section. The printer controller 4 designates the destination and determines that the print data should be sent by facsimile. Then, the destination is designated via the FAX controller 5. The printer controller 4 reads the destination information registered at the FAX controller 5 and the status of the controller 5 via the system controller 1, thereby determining how it should process the print data. Then, the printer controller 4 transfers the print data to the FAX controller 5 via the system controller 1 after providing the print data with a format suitable for the transfer.

The FAX controller 5 processes the information on the destination and transfer method received from the printer controller 4 via the system controller 1, thereby designating the destination and executing various settings. Further, the FAX controller 5 processes the print data received from the printer controller 4 and then transmits the print data to the destination.

As stated above, the control system (19) allows the destination of facsimile communication to be entered on the host 8 and thereby makes it needless for the operator of the host 8 to walk up to the apparatus A.

Control System (20)

Assume that a command for the registration of a telephone directory for facsimile communication or a command meant for a particular facsimile setting is delivered from the host 8 to the apparatus A. Then, the printer controller 4 interprets the command and recognizes that a telephone directory should be registered at the FAX controller 5 or that a particular setting should be done in the controller 5. The command urges the system controller 1 to cause the printer controller 4 to arrange the request item indicative of the kind of the setting meant for the FAX controller 5 or the kind of the registration. In response, the system controller 1 interprets the request from the printer controller 4, arranges it, and informs the FAX controller 5 of the request. The FAX controller 5 determines whether or not it can comply with the request. If the FAX controller 5 can comply with the request, it executes it and then reports the result to the system controller 1. If the FAX controller 5 cannot comply with the request or if it fails during execution, it reports such a condition to the system controller 1. In response, the system controller 1 reports whether or not the execution was successful to the printer controller 4.

In this manner, the printer controller 4 can determine whether or not the request item has been successfully executed by the FAX controller 5. If it has not been executed and if the item is undesirable for the following procedure, it is replaced with another processing. As a result, a procedure after command processing can be smoothly executed.

Control System (21)

To obtain information on the FAX controller 5 (e.g. information on the other party), the printer controller 4 arranges the kind of information needed and a format in which it should receive the information. On selecting a format, the printer controller 4 requests the system controller 1 to deliver information so as to obtain information in the determined format. At this instant, the printer controller 4 can send such a request to the system controller 1 in one of a plurality of methods which is optimal for the determined format. The printer controller 4, selected the optimal method, urges the system controller 1 to respond to the request by using the optimal method.

Also, the system controller 1 can respond to the FAX controller 5 by one of a plurality of methods, and selects a method matching the request from the printer controller 4 and the current conditions of the apparatus A. In response, the FAX controller 5 returns an answer to the system controller 1 in a format and method required of it. The answer includes requested information (on the other party registered at the telephone directory) and facsimile conditions (memory occupancy and file information). The system controller 1, receiving the answer from the FAX controller 5, selects the optimal format and method matching the above-mentioned factors. Then, the system controller 1 delivers the information on the FAX controller 5 to the printer controller 4.

The control system (21) is applicable to a case wherein the printer controller 4 needs facsimile information. The information may be the information on the other party in the control system (15) or the facsimile condition in the control system (16).

As stated above, the printer controller 4 can obtain information on the FAX controller 5. The controller 4, therefore, can arrange print data in a format matching the type of a facsimile apparatus at the destination on the basis of the information on the other party. Further, the controller 4 can deal with print data to be sent by facsimile in an adequate manner matching the memory occupancy and other facsimile conditions.

Control System (22)

The host 8 and printer controller 4 are connected by a bidirectional interface (e.g. RS232C). Information on the FAX controller 5 fed to the printer controller 4 by the control system (21) can be transferred to the host 8 via the interface. In this case, the printer controller 4 requests the system controller 1 to provide it with the information in a format and by a method assigned to the direct transfer to the host 8. Also, the printer controller 4 can arrange and store the information received from the FAX controller 5 via the system controller 1 and can transfer the information to the host 8 when requested. In addition, the printer controller 4 can provide the host 8 with a communication control report, which is one of the information on FAX controller 5, via the bidirectional interface. The transfer method to the host 8 may be determined beforehand by use of, for example, a printer command.

Control System (23)

By the control system (21), it is possible to send the information on the FAX controller 5, i.e., on the other party to the host 8 every time communication (transmission or reception) is held by the printer controller 4. A control system to be described additionally has a mode for sending information on the other party to the host 8 every time communication is held by either the printer controller 4 or the FAX controller 5. The information particular to this mode includes a command from the host 8 and panel settings in the case of the printer controller 4, or panel settings and company-oriented commands in the case of the printer controller 4. The printer controller 4 or the FAX controller 5, conditioned for this mode, informs the system controller 1 of the fact that information on the other party should be reported to the host 8 each time of transmission and reception of the FAX controller 5.

On receiving the report from the printer controller 4, the system controller 1 informs the FAX controller 5 of the additional mode stated above. Likewise, the system controller 1 informs the printer controller 4 of such a mode on receiving the report from the FAX controller 5. Then, the printer controller 4 and FAX controller 5 each prepares for the operation in the additional mode. For example, the printer controller 4 opens the bidirectional host I/F circuit 17 and prepares for the storage and management of facsimile data, while the FAX controller 5 sets up a condition for reporting information on the other party to the printer controller 4 via the system controller 1.

Thereafter, in the event of facsimile transmission or reception, the FAX controller 5 reports information on the other party to the printer controller 4 via the system controller 1. In response, the printer controller 4 transfers the information to the host 8 via the bidirectional host I/F circuit 17.

In the above configuration, both the printer controller 4 and the FAX controller 5 recognize the additional mode described above. Alternatively, the system controller 1 may recognize it and deliver an adequate request to each of the controllers 4 and 5. Because the system controller 1 supervises the controllers 4 and 5, it can detect the transmission or reception of the controller 5. Further, when communication occurs between the system controller 1 and the FAX controller 5, a procedure for informing the printer controller 4 of information on the other party may be executed in order to command the controller 4 to report it to the host 8 via the host I/F circuit 17.

Control System (24)

The host 8 and printer controller 4 are connected by two interfaces. One interface is used to transfer print data while the other interface is a bidirectional interface for transferring commands and results derived therefrom. A command sent from the host 8 to the printer controller 4 via the bidirectional interface is applied to the command analyzing circuit 19. The analyzing circuit 19 determines whether or not the input command is meant for the printer controller 4. If the command is meant for the printer controller 4, it is directly processed by the printer controller 4. If the command relates to a combined function, it is fed to the system controller 1 and analyzed by the command analyzing circuit 13. The result of analysis and subsequent processing is returned to the host 8 via the host I/F circuit 17 of the printer controller 4.

The control system (24) described above allows the combined printer and facsimile function to be manipulated on the host 8.

Control System (25)

When a facsimile document is received over the subscriber line 9, the CPU 22 determines whether it is image data or text data and then stores it in the RAM 26 together with the result of decision. When a command requesting a received facsimile file is sent from the host 8 to the CPU 16 via the host I/F circuit 17, the command analyzing circuit 13 of the system controller 1 analyzes it. Then, the requested file is transferred from the RAM 26 of the FAX controller 5 to the host via the host I/F circuit 17. In this manner, print data received by facsimile can be controlled on the host 8.

Control System (26)

When a file transfer request based on the facsimile function is sent from the host 8 to the CPU 16 via the host I/F circuit 17, it is transferred to the system controller 1 and analyzed by the command analyzing circuit 13. Subsequently, destination information and print data received via the host I/F 17 are delivered to the CPU 22 under the control of the system controller 1 and then transmitted via the line controller 23. With this control system, it is possible to transmit a file stored in the host 8 by facsimile by using only the interface assigned to the printer.

Control System (27)

When a command requesting the relay transmission of print data is received from the host 8 via the host I/F circuit 17 of the printer controller 4, it is input to the system controller 1 and analyzed by the command analyzing circuit 13. Subsequently, information on a relay station, information on a destination, and print data are received via the host I/F circuit 17 and transferred to the FAX controller 5 under the control of the system controller 1. As a result, the data are transmitted to the destination by way of the relay station. In this manner, a desired facsimile transmission route for print data can be selected on the host 8 by remote control, so that the easy operation of the apparatus A is promoted.

Control System (28)

The host 8 and printer controller 4 are connected by a plurality of interfaces. When a printer request is received via one of the interfaces, whether or not the printer function is busy is determined. If the printer function is not busy, print data are processed by the CPU 16 of the printer controller 4 and then printed out by the printer 2. If the printer function is busy, the print data are delivered to the system controller 1 and then sent from the controller 1 to the FAX controller 5 together with registered transfer information. The print data are transferred from the FAX controller 5 to a nearby manifold apparatus A and printed out thereby. This control system, therefore, can comply with print requests from two hosts at the same time, thereby reducing the waiting time.

In summary, it will be seen that the present invention provides a manifold apparatus having various unprecedented advantages as enumerated below.

(1) Only if print data are sent from a host computer to a printer function, an optimal transmission mode is selected. This makes it needless for the operator of the host computer to be aware of the functions available with the destination, thereby reducing communication cost.

(2) It is possible to select only a desired page or pages out of the print data received from the host computer and send them by facsimile. This successfully saves paper and communication cost.

(3) Only desired pages can be sent by facsimile or printed. This saves running cost while reducing the waiting time. Hence, the apparatus is easy to use.

(4) Only desired pages can be printed while being sent by facsimile at the same time. This also saves running cost and waiting time and thereby ensures the easy use of the apparatus.

(5) The end of transmission is reported to the host 8 by way of the printing function. This makes it needless for the operator of the host computer to operate the apparatus for confirmation. That is, the operator should only wait for the report from the apparatus.

(6) The result of reception is reported to the host computer via the printing function, and therefore makes it needless for the operator of the host computer to manipulate the apparatus for confirmation. This enhances the efficient use of the apparatus and requires the operator only to access the apparatus or wait for a report from the apparatus.

(7) It is possible to deal with a transmission request and a print request by use of a single command.

(8) As stated above, received data are reserved in an auxiliary storage even after they have been printed out on paper. This allows the received data to be used later.

(9) Overlay printing is achievable with the combination of the printer function and facsimile function. This successfully reduces the amount of data to be sent or received and, therefore, reduces the communication (line) cost.

(10) When the facsimile function also uses a regular form, data can be transmitted or received in a regular format due to the overlaying function.

(11) It is possible for the operator of the host computer to select only particular received data and cause the printer function to print them out.

(12) The operator of the host computer is allowed to cancel transmission, delete data to be transmitted, change or add data, or combine a plurality of data, as desired. Further, the operator can effect facsimile transmission without walking up to the facsimile body.

(13) It is possible to report the top-and-bottom position of a document to be sent and to determine the position of a received document on the basis of a marker.

(14) Received data are allowed to be rotated in accordance with a command contained in the data. Therefore, a transmitting terminal can specify an outputting direction.

(15) When a print output image is to be sent as facsimile data, an image memory is constituted in a millimeter-based size and then subjected to inch-to-millimeter conversion by an inch-based resolution particular to a printer closest to the memory. Because a font image is not changed in magnification, the millimeter-based image is prevented from being degraded.

(16) When print data are directly converted to facsimile data to be sent or received, the printer is caused to output an image while reducing the data in size in matching relation to the paper size available at the receiving station. This ensures an optimal output while protecting the image quality from noticeable deterioration.

(17) An image command and image data are separated from print data while the remaining data are divided into pages matching the size of papers. Only image data are transformed to an image. Code data are sent as they are by facsimile while image data are sent as an image after compression. At a receiving station, a composite image consisting of the image and code data is produced. This successfully reduces the amount of facsimile data to be transmitted.

(18) Only the first page of a document can be provided with a comparatively low resolution, so that the amount of data to be transmitted by facsimile can be reduced.

(19) The destination of facsimile communication is allowed to be entered on the host computer. This makes it needless for the operator of the host computer to walk up to the apparatus.

(20) Because settings meant for the facsimile function (including the registration of a telephone directory) can be effected on the host computer, the operator does not have to walk up to the apparatus.

(21) The facsimile destination data can be converted in matching relation to the type of the other terminal when print data of the printer are sent by facsimile. This enhances efficient transmission and image quality.

(22) A printer controller can determine the conditions of the facsimile body. Hence, if a memory included in the facsimile function is full when the print data of the printer should be sent by facsimile, such print data are once stored in the printer and then sent as soon as the line becomes idle. This implements memory transmission.

(23) By transferring information on the facsimile function to the host computer via a bidirectional interface, it is possible for the operator of the host computer to obtain a communication control report or similar information without walking up to the apparatus.

(24) Because information on the other party is transferred to the host computer each time of facsimile communication, the other party can be managed on the host computer.

(25) The combined printer function and facsimile function can be easily controlled on the host computer.

(26) Print data received by facsimile can be preserved and controlled on the host computer.

(27) A file stored in the host computer can be transferred by facsimile only if an interface assigned to print data is used.

(28) A facsimile transmission route for print data can be determined on the host computer, so that the apparatus is easy to operate.

(29) Even print requests received from two host computers can be complied with at the same time, thereby reducing the waiting time.

What is claimed is:

1. A manifold apparatus comprising:
    a printer for printing print data;
    a facsimile for transmitting and receiving facsimile data;
    a printer controller for controlling the printer;
    a facsimile controller for controlling the facsimile;
    a bidirectional interface for allowing said printer and facsimile to communicate with at least one host computer, and for transmitting the print data and facsimile data; and
    a controller for controlling storing print data from the at least one host computer through the bidirectional interface, and for controlling selecting and transmitting only a selected portion of the print data from the at least one host computer through the facsimile.

2. The manifold apparatus according to claim 1, further comprising means for allowing, when the print data is transmitted by the facsimile, a specified transmission route for facsimile transmission to be selected through the host computer.

3. The manifold apparatus according to claim 1, wherein the at least one host computer includes a plurality of host computers, and wherein when a print request to the printer is received from a first of the plurality of host computers, and if the printer is occupied by a second of said plurality of host computers, print data from the first of the plurality of host computers is sent by facsimile to a second manifold apparatus which includes a second facsimile and a second printer to print out the print data.

4. A manifold apparatus comprising:

printer means for printing print data;

facsimile means for transmitting and receiving facsimile data;

printer control means for controlling the printer means;

facsimile control means for controlling the facsimile means;

a bidirectional communication means for allowing said printer means and facsimile means to communicate with a host computer, and for transmitting the print data and facsimile data; and a control means for controlling storing print data from the host computer through the bidirectional communication means, and for controlling selecting and transmitting only a selected portion of the printed data from the host computer through the facsimile means.

5. A manifold apparatus comprising:

a printer for printing print data;

a facsimile for transmitting and receiving facsimile data;

a printer controller for controlling the printer;

a facsimile controller for controlling the facsimile;

a bidirectional interface for allowing said printer and facsimile to communicate with a host computer, and for transmitting the print data and facsimile data; and a controller for controlling storing print data from the facsimile, and for controlling selecting and transmitting only a selected portion of the received facsimile data from the host computer to the printer.

6. A manifold apparatus comprising:

printer means for printing print data;

facsimile means for transmitting and receiving facsimile data;

printer control means for controlling the printer means;

facsimile control means for controlling the facsimile means;

a bidirectional communication means for allowing said printer means and facsimile means to communicate with a host computer, and for transmitting the print data and facsimile data; and a control means for controlling storing received facsimile data from the facsimile means and for controlling selecting and transmitting only a selected portion of the received facsimile data from the host computer to the printer means.

* * * * *